UNITED STATES PATENT OFFICE.

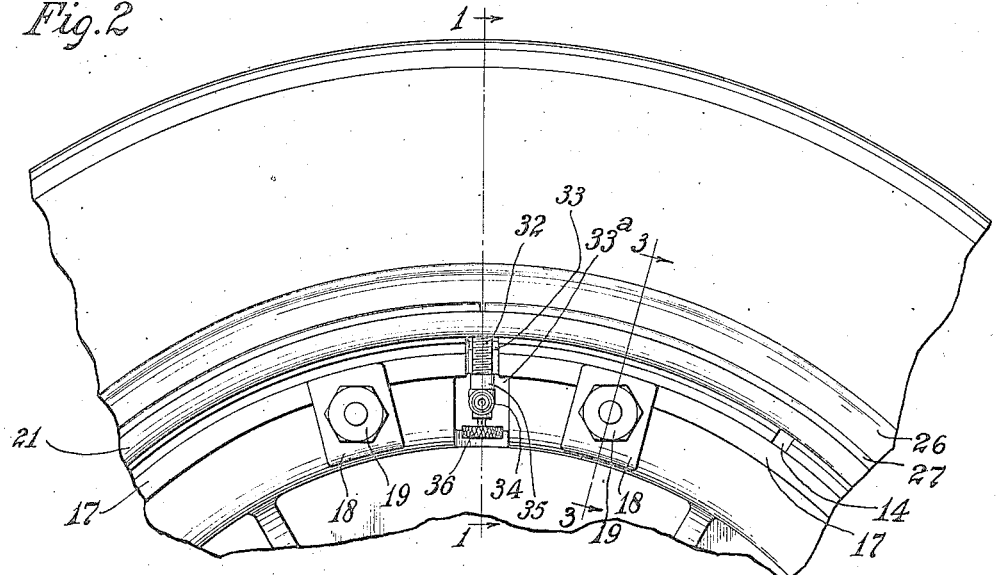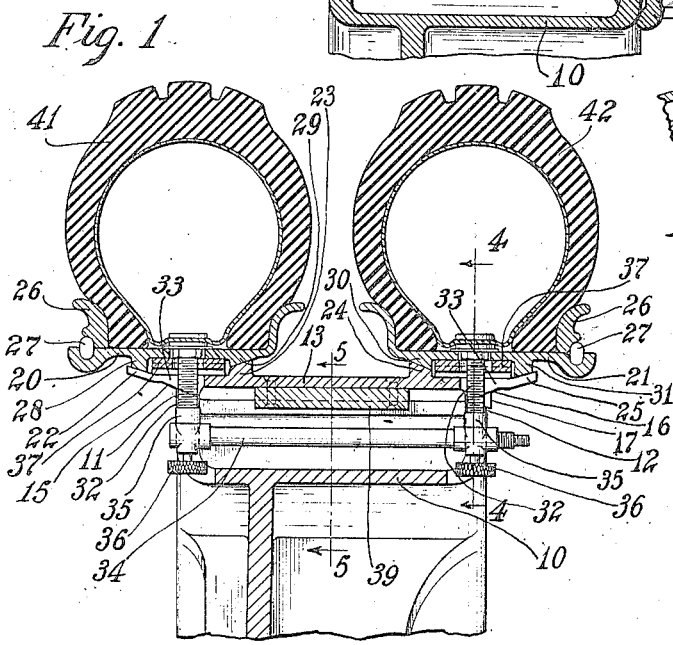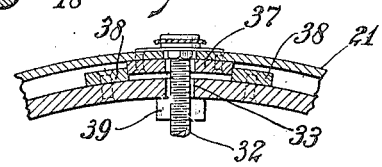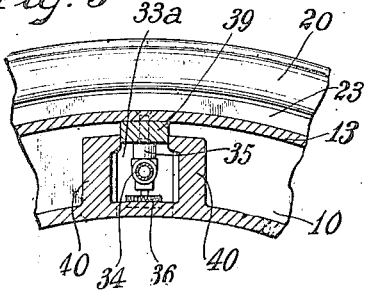

JOHN R. GAMMETER, OF AKRON, OHIO, ASSIGNOR TO THE B. F. GOODRICH COMPANY, OF NEW YORK, N. Y., A CORPORATION OF NEW YORK.

VEHICLE-WHEEL-RIM STRUCTURE.

1,404,754.   Specification of Letters Patent.   Patented Jan. 31, 1922.

Application filed June 14, 1920. Serial No. 388,748.

*To all whom it may concern:*

Be it known that I, JOHN R. GAMMETER, a citizen of the United States, residing at Akron, in the county of Summit and State of Ohio, have invented a certain new and useful Vehicle-Wheel-Rim Structure, of which the following is a specification.

This invention relates to structures for carrying a plurality of tires side by side on the same wheel in such manner that the tires may be demounted or detached, a common example being the so-called "dual tire" equipment.

In such equipment, especially for pneumatic tires, it is desirable that the inner tire of the pair, next the vehicle body, or said tire and its rim when demountable rims are employed, shall be readily accessible and easily removable, but in these equipments as heretofore used it has been necessary to take off the outer tire, or tire and rim, before removing the inner one, and also to remove one or more slidable rings from between or under the tires or rims, which rings often come off with great difficulty. My principal object is to overcome these objections.

Of the accompanying drawings, showing a preferred embodiment;

Fig. 1 is a cross-section, taken on the line 1—1 of Fig. 2, of a wheel having a dual tire-mounting constructed according to my invention.

Fig. 2 is a partial side view of the same.

Fig. 3 is a section on line 3—3 of Fig. 2.

Fig. 4 is a section on line 4—4 of Fig. 1.

Fig. 5 is a section on line 5—5 of Fig. 1.

In the drawings, 10 is a permanent rim, provided with external circumferential, radial frusto-conical, rim-seating flanges 11 and 12, the outer one, 12, of which is radially shorter than the inner flange 11. 13 is a demountable, annular supporting base or member constituting an intermediate rim, split transversely as shown at 14 in Fig. 2, and having internal, circumferential, radial inner and outer flanges 15 and 16 whose peripheral surfaces are formed as frustums of female cones with their small ends adjacent, the inner flange 15 seating upon the fixed rim flange 11, while the outer one 16 seats upon a transversely-split wedging ring 17 which in turn seats upon the outer fixed rim flange 12 and is secured in place by clamps 18 and bolts 19.

The intermediate rim 13 has mounted thereon two individual tire-carrying rims, 20 and 21, which may be of any suitable construction, with pneumatic tires 41, 42 thereon. As shown, the rim 13 is provided externally with two pairs of integral circumferential flanges, 22, 23 and 24, 25, peripherally formed with reverse frustums of male cones having their smaller ends adjacent, and the inner peripheries of the tire-rims, 20, 21 are formed with two pairs of complemental frusto-conical flanges 28, 29 and 30, 31 seating upon the flanges 22, 23 and 24, 25. The rims 20, 21 are shown as provided with removable bead-retaining rings 26, 26 and transversely-split locking rings 27, 27 for said bead-retaining rings.

32, 32 are the tire-inflating valves or stems. To permit the mounting of the tires, the intermediate rim 13 is formed with slots or recesses 33 extending laterally in from each edge, and the permanent rim 10 is formed with a slot 33$^a$ extending clear across it. I prefer to connect the two valve stems with a trunk pipe 34, as shown, whose end fittings are attached to the stems by means of couplings 35, and provide at each branch or valve stem a stop-valve 36, thus permitting the inflation of the tires singly or both at once. Each tire-carrying rim 20, 21 has a driving lug 37 on its inner periphery, lodged between a pair of complemental driving lugs 38 on the outer periphery of the intermediate rim, and similarly, the intermediate rim has on its inner periphery a driving lug 39 occupying the slot 33$^a$ formed between a pair of complemental driving lugs 40 on the permanent rim 10, to prevent circumferential movement of the several rims on their immediate supports.

In applying dual tires to the wheel, the tires are first mounted individually upon their respective tire-carrying rims 20, 21, and secured thereon by the bead rings 26, 26 and locking rings 27, 27. These rims with their tires are then placed in position, from opposite sides, upon the intermediate rim 13, which is contracted to receive them, and which when expanded outwardly against the tire rims, will interlock therewith through the flanges 22, 23, 28, 29 and 24, 25, 30, 31. The valve stems 32 are then connected by the pipe 34, and the two tires preferably inflated simultaneously to approximately the same pressure while off the wheel, the two stop valves 36 being left open for this purpose and the pressure being retained by the usual check-valve or "insides" in the stems 32. The intermediate rim 13, carrying the dual tires on their respective rims, is then placed in position on the wheel and secured thereon by means of the wedging ring 17, under the action of the clamps 18 and bolts 19. The wedging action of the ring 17 not only secures the intermediate rim 13 upon the wheel, but also expands it firmly against the tire-carrying rims 20 and 21. The tires are removed from the wheel by the reverse operation. The heads of the stop-valves 36 may clear the bottom of the channel of the fixed rim 10 when said valves are screwed fully home, or if not arranged to clear it, they may be removed before applying or removing the rim 13.

My invention permits not only the handling of the two tires as a unit, but the removal of the inner tire or rim without deflation or removal of the outer tire or rim from its immediate supporting base and without having to remove a slidable ring or rings from between or under the tire-holding rims.

I claim:

1. In a tire mounting, a demountable, transversely-split annular member adapted internally to be seated on a permanent rim and adapted externally to carry a plurality of tire-carrying rims.

2. In a rim structure for dual tires, a demountable, transversely-split annular member adapted internally to be seated on a permanent rim and adapted externally to receive from opposite sides and seat two tire-carrying rims.

3. In a tire mounting, the combination of a transversely-split demountable annular member internally adapted to be seated on a permanent rim, and adapted externally to carry a plurality of tires, a permanent rim adapted to seat said annular member, and means for retaining said member on the permanent rim, said means acting to expand said member outwardly.

4. In a rim structure for dual tires, the combination of a demountable, transversely-split, intermediate rim adapted internally to be seated on a permanent rim, demountable tire-carrying rims adapted to be placed on said intermediate rim from opposite sides thereof, radially interlocking members on the adjacent faces of said intermediate rim and said tire-carrying rims, a wheel having a permanent rim supporting said intermediate rim, and wedging means demountably securing the intermediate rim upon the permanent rim and serving to expand the former outwardly into interlocked engagement with the tire-carrying rims.

In witness whereof I have hereunto set my hand this 9th day of June, 1920.

JOHN R. GAMMETER.